United States Patent [19]

Ohno et al.

[11] Patent Number: 5,381,411
[45] Date of Patent: Jan. 10, 1995

[54] APPARATUS FOR CONTROLLING ATM CELL GENERATION RATE

[75] Inventors: Koichi Ohno, Yokohama; Tetsuo Tachibana, Kawasaki, both of Japan

[73] Assignee: Fujitsu Limited, Kawasaki, Japan

[21] Appl. No.: 189,057

[22] Filed: Jan. 31, 1994

[30] Foreign Application Priority Data

Sep. 7, 1993 [JP] Japan .................. 5-221756

[51] Int. Cl.⁶ .................. H04J 3/16; H04L 12/66
[52] U.S. Cl. .................. 370/60; 370/79; 370/84; 370/94.1
[58] Field of Search .................. 370/60, 60.1, 79, 84, 370/94.1, 94.2

[56] References Cited

U.S. PATENT DOCUMENTS

| | | | |
|---|---|---|---|
| 4,763,319 | 8/1988 | Rozenblit | 370/84 |
| 5,117,417 | 5/1992 | Danner | 370/84 X |
| 5,128,924 | 7/1992 | Le Bihan | 370/60 X |
| 5,189,672 | 2/1993 | Le Bihan | 370/60 X |

*Primary Examiner*—Melvin Marcelo

[57] ABSTRACT

A bit rate control circuit of the present invention includes a timer controller and a memory. In one aspect of the present invention, words stored in the memory are addressed by addresses corresponding to data channels. Each of the words includes an enable flag, a set value and an operation value. The set values are determined based on bit rates assigned to the corresponding data channels. The words are scanned at constant intervals. The operation values are updated by adding one when the enable flag is active, in each scan, and if the updated operation value reaches the set value, a command to generate an ATM cell for the corresponding data channel is issued.

6 Claims, 8 Drawing Sheets

Fig. 2

| | 26 | 28 | 30 |
|---|---|---|---|
| ADDRESS 1 (ch-1) | 1 | (FF)h | (00)h |
| ADDRESS 2 (ch-2) | 0 | (30)h | (00)h |
| | . . . . . | . . . . . | . . . . . |
| ADDRESS N (ch-N) | 1 | (01)h | (00)h |

APPARATUS FOR CONTROLLING ATM CELL GENERATION RATE

BACKGROUND OF THE INVENTION

1. Field of the Invention

The present invention relates to an apparatus for controlling generation of data cells, and more particularly, to an apparatus for controlling generation of ATM cells which are required to be generated from plural channel data within the respective bit rates assigned thereto.

2. Description of the Related Art

A protocol in an ATM layer of an ATM (Asynchronous Transfer Mode) network or an ATM LAN (Local Area Network) is simple in order to realize it by hardware circuits. Data are transmitted in a form of ATM cells having fixed data length (53 bytes), and cells are simply discarded when congestion of cells occurs in the network. Therefore, traffic control in a higher layer such as an AAL (ATM Adaptation Layer) is necessary to maintain quality of services in individual connections.

In the case of an AAL which adapts plural data terminals or a data network to the ATM, a bit rate of data transmitted in each data channel is assigned to each data channel, and generation of ATM cells of each data channel is controlled based on the assigned bit rate.

The bit rate control could be carried out in a CLAD (Cell Assembly/Disassembly) circuit provided corresponding to each data terminal. However, numerous control circuits would be required in the AAL which adapts numerous e.g. a thousand data terminals, if the bit rate control were carried out in the CLAD circuit provided corresponding to the data terminal.

SUMMARY OF THE INVENTION

It is an object of the present invention to provide an apparatus for controlling generation of cells, which is capable of handling data from numerous data terminals.

In accordance with the present invention, there is provided an apparatus for controlling generation of cells including data received from a plurality of data channels, the generation of cells being required to accord to bit rates assigned to the respective data channels, comprising a memory for storing data determined based on the bit rates of the respective data channels, and a controller for accessing the data stored in the memory at constant intervals to determine timing for generating the cells, and for issuing commands to generate the cells according to the determined timing.

DESCRIPTION OF THE PREFERRED EMBODIMENTS

Figure 1:
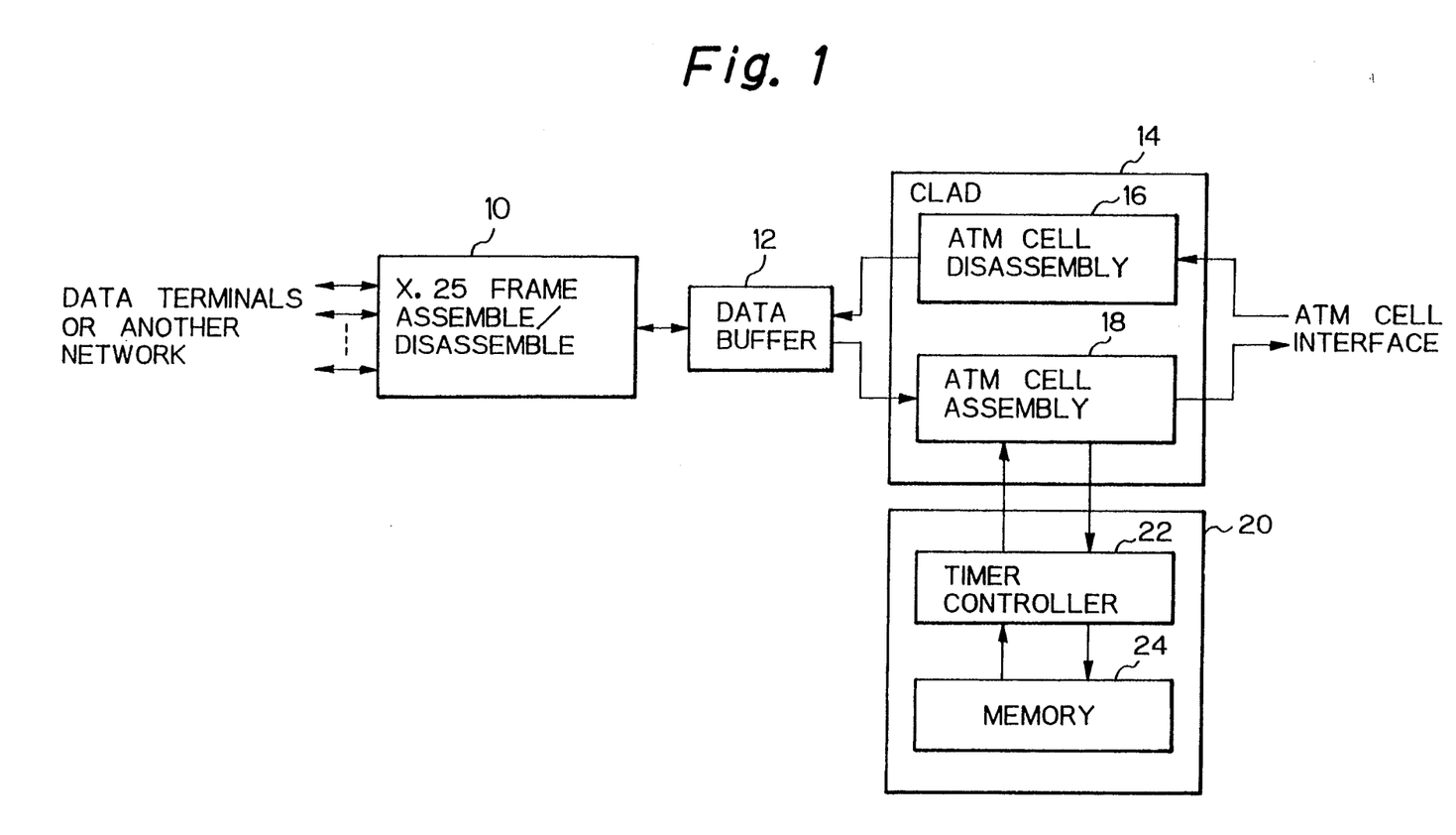
FIG. 1 is a block diagram showing a communication system which include a bit rate control circuit according to an embodiment of the present invention.

FIG. 1 shows a communication system including a bit rate control circuit according to an embodiment of the present invention.

In FIG. 1, packet data received from data terminals or another network are disassembled in an X.25 frame assemble/disassemble unit 10, and are stored in a data buffer 12, separately with respect to individual data channels. A CLAD 14 includes an ATM cell disassembly unit 16 for disassembling ATM cells and an ATM cell assembly unit 18 for assembling ATM cells. A bit rate control circuit 20 according to the present invention includes a timer controller 22 and a memory 24. The ATM cell assembly unit 18 reads out fixed length of channel data specified by the timer controller 22, and assembles an ATM cell including it, based on a command issued by the timer controller 22. The timer controller 22 accesses the contents of the memory 24 at constant intervals, and issues a command based on the contents of the memory 24, as described below.

Figure 2:
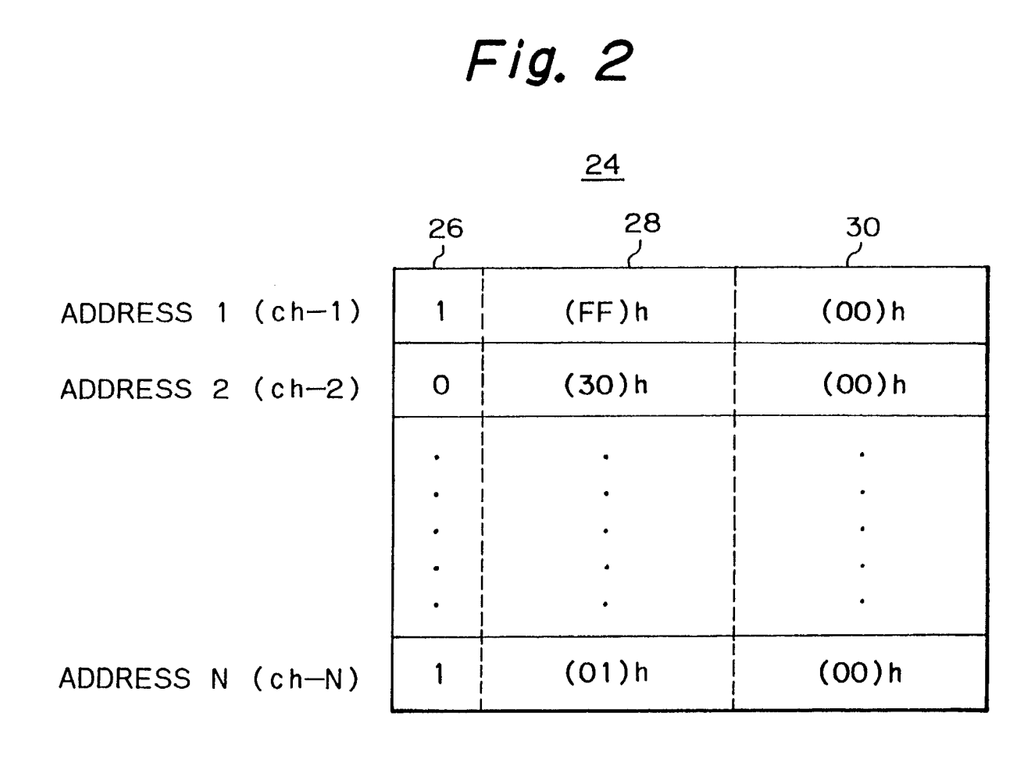
FIG. 2 is a diagram showing the contents of the memory in a first example of the bit rate control circuit shown in FIG. 1.

FIG. 2 shows the contents of the memory 24 in a first example of the bit rate control circuit 20. Addresses 1 to N of the memory 24 correspond to data channels 1 to N, respectively. Each word addressed by one of the addresses 1 to N includes three fields; one bit of enable flag 26, m bits of set value field 28, and m bits of operation field 30. When a channel is not used, corresponding enable flag 26 is set to "0", and when a channel is used, corresponding enable flag 26 is set to "1". Set values corresponding to bit rates assigned to the respective data channels are stored in the set value fields 28. The operation fields 30 store operation values which are to be compared with the contents of the corresponding set value fields 28.

Figure 3:
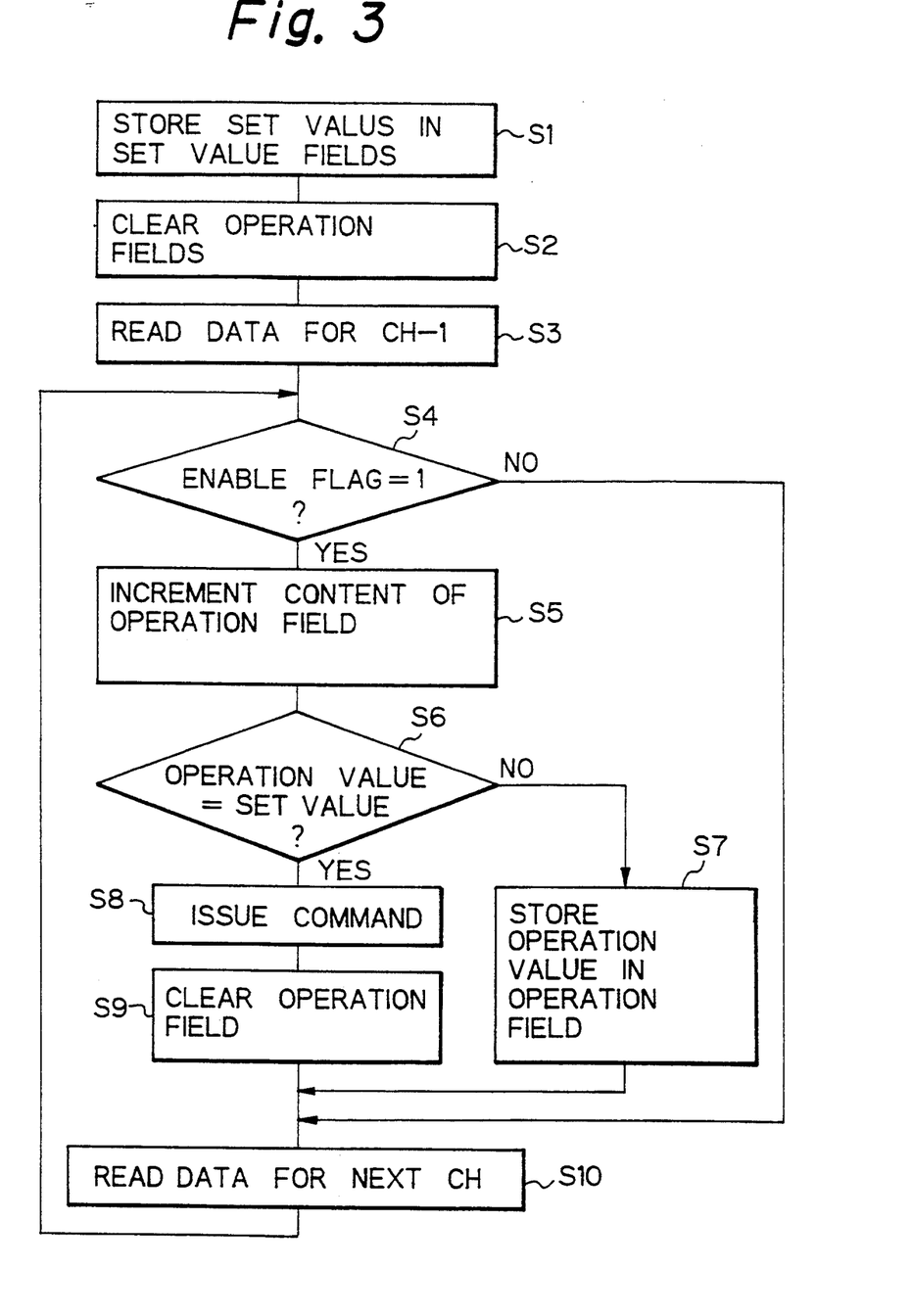
FIG. 3 is a flow chart showing an operation of the timer controller in the first example of the bit rate control circuit.

FIG. 3 shows an operation of the timer controller 22 in the first example of the bit rate control circuit 20. In step S1, the timer controller 22 receives the set values from the CLAD 14, and store them in the set value fields 28. The timer controller 22 clears operation fields 30 in step S2, and reads out data with regard to CH-1 in step S3. If the enable flag is "0", the process is advanced to step S10. If the enable flag is "1", the operation value read out from the operation field is updated by incrementing by one in step S5. The updated operation value is compared with the set value read out from the set value field, in step S6. If the operation value does not reach the set value, the updated operation value is returned to the same address, in step S7. If the operation value is equal to the set value, a command requiring generation of an ATM cell of that channel is issued to the ATM cell assembly unit 18 in step S8, and the operation field of that channel is cleared in step S9. After data of next address is read out in step S10, the process returns to step S4.

In the example shown in FIG. 2, since (FF) h(=255) is stored in the set value field 28 of the address 1 (channel 1), ATM cells of the data channel 1 are generated at intervals of $255 \times T \times N$ where T is a period required for processing a single channel and N is the number of channels. ATM cells of the data channel N are generated at the shortest intervals of T×N. The bit rates are inversely proportional to those intervals.

Figure 4:
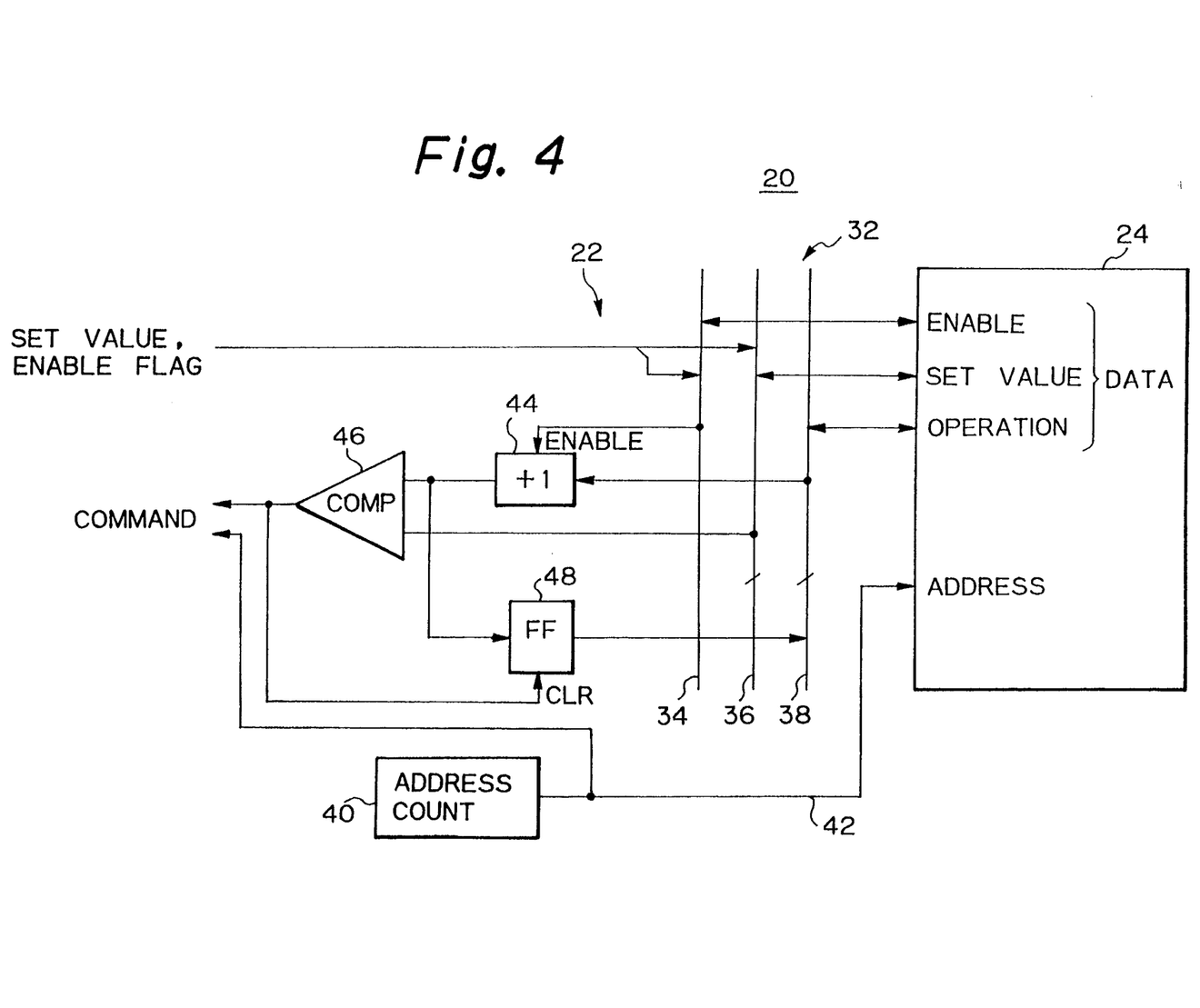
FIG. 4 is a circuit diagram showing a detailed construction of the first example of the bit rate control circuit.

FIG. 4 shows a detailed construction of the first example of the bit rate control circuit 20. A data bus including an enable flag line 34 is connected to an enable flag bit of the memory 24, a set value bus 36 is connected to set value bits of the memory 24, and an operation value bus 38 is connected to operation value bits of the memory 24. Addresses of the memory 24 are fed by an address counter 40 which cyclically outputs addresses 1 to N via an address bus 42. An adder 44 adds 1 to an operation value on the operation value bus 32 when an enable flag on the enable flag line 34 is active. A comparator 46 compares an output of the adder 44 with a set value on the set value bus 36, and outputs a command when both are equal. The command output from the comparator 46 is sent to the CLAD 14 with an address on the address bus 42. A flip-flop 48 latches the output of the adder 44. Data latched in the flip-flop 48 are cleared when the command is output from the comparator 46. Lines for providing the set value and the enable flag from the CLAD 14 are connected to the enable flag line 34 and the set value bus 36, respectively.

Figure 5:
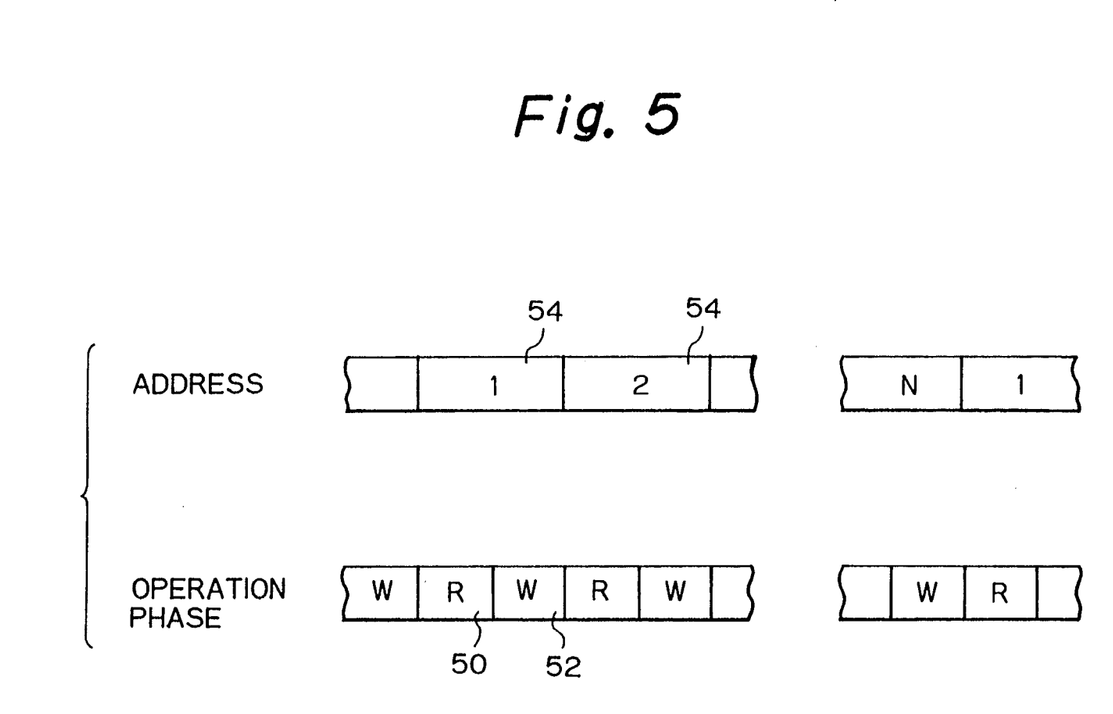
FIG. 5 is a timing chart showing an operation of the timer controller shown in FIG. 4.

FIG. 5 shows the operation of the timer controller 22 in FIG. 4. A memory read phase 50 and a memory write phase 52 alternately occur for each address period 54. In the memory read phase 50, data addressed by an address on the address bus 42 are read out from the memory 24. A value "1" is added to the operation value on the operation value bus 38 if the enable flag on the enable flag line 34 is active, in the adder 44, and the output of the adder 44 is compared with the set value on the set value bus 36, in the comparator 46. At the end of the memory read phase 50, the output of the adder 44 is latched in the flip-flop 48. In the memory write phase 52, the data latched in the flip-flop 48 are written in the memory 24 at a location addressed by the address on the address bus 42. When the enable flag and/or a set value are altered, these data are also written in this phase.

Figure 6:
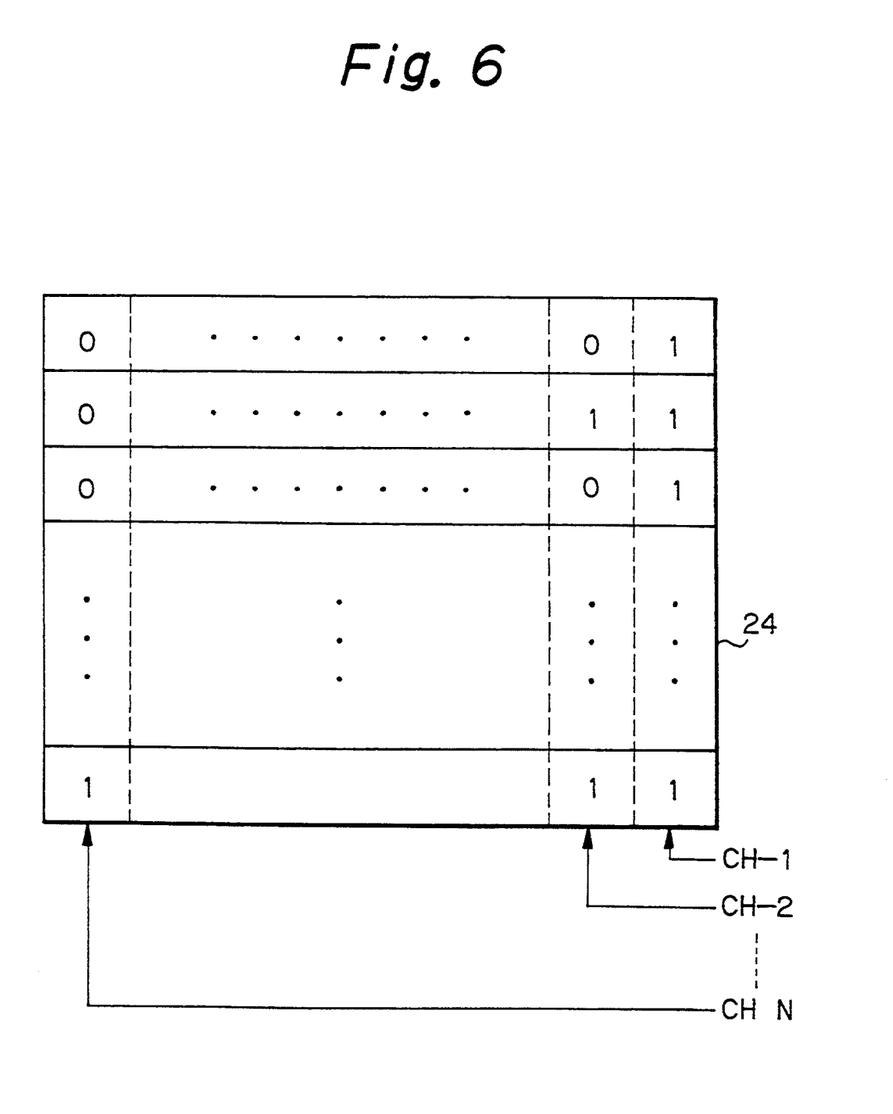
FIG. 6 is a diagram showing the contents of the memory in a second example of the bit rate control circuit.

FIG. 6 shows the contents of memory 24 in a second embodiment of the bit rate control circuit 20. Each word of memory 24 consists of N bits, each of which corresponds to data channel 1, 2 ... N.

Figure 7:
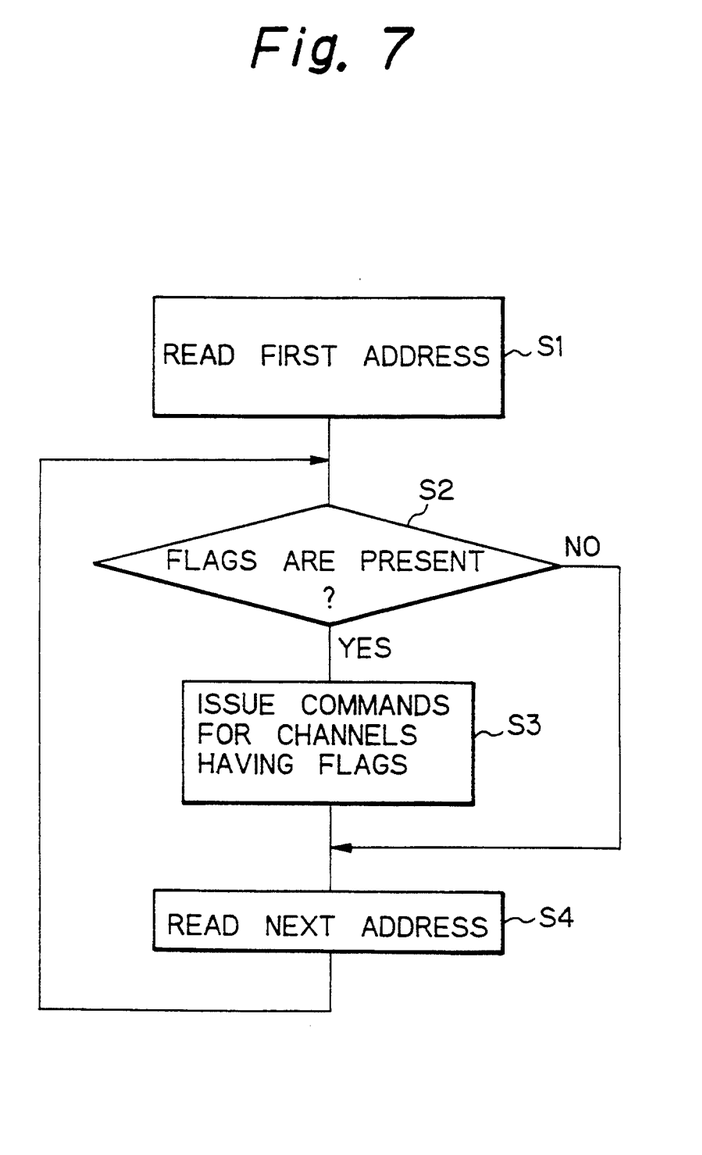
FIG. 7 is a flow chart showing an operation of the timer controller in the second example of the bit rate control circuit.

FIG. 7 shows the operation of the timer controller 22 in the second example of the bit rate control circuit 20. In step S1, a word stored in the first address of the memory 24 is read out. In step S3, a command requiring generation of an ATM cell is issued with respect to a data channel which corresponds to a bit position of a flag within the word. If the word has a plurality of flags, a plurality of commands are successively issued. In step S4, a word stored in the next address of the memory 24 is read out, and the process returns to Step S2.

Figure 8:
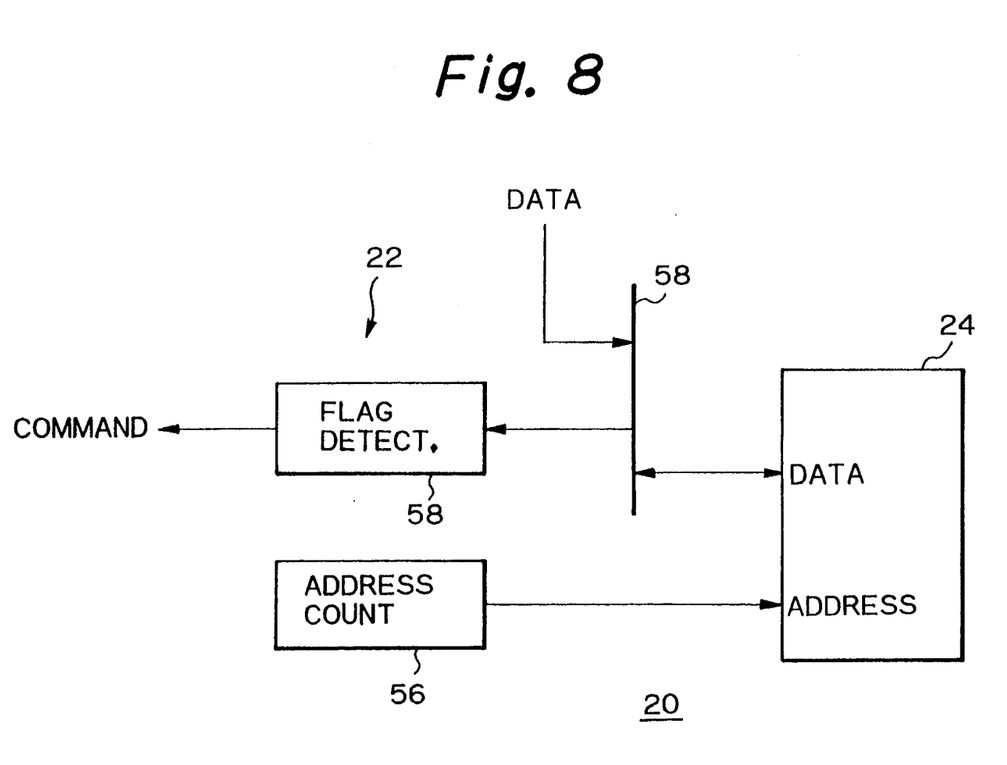
FIG. 8 is a circuit diagram showing a detailed construction of the second example of the bit rate control circuit.

FIG. 8 shows a detailed construction of the second example of the bit rate control circuit 20. The timer controller 22 in the second example of the bit rate control circuit 20 includes an address counter 56 and a flag detector 58. The address counter 56 cyclically generates addresses for the memory 24. The flag detector 58 detects flags in each word read out through a data bus 58 from the memory 24, and issues commands with respect to data channels which correspond to bit positions of flags existing within each word.

In the example of FIG. 6, since the LSB of every word is "1", ATM cells for the data channel 1 are generated at intervals of T where T is a period required for processing each word. ATM cells of a data channel whose flags appears every M-th word are generated at intervals of T×M.

We claim:

1. An apparatus for controlling generation of cells including data received from a plurality of data channels, the generation of cells being required to accord to bit rates assigned to the respective data channels, comprising:
  a memory for storing data determined based on the bit rates of the respective data channels; and
  a controller for accessing the data stored in the memory at constant intervals to determine timing for generating the cells, and for issuing commands to generate the cells according to the determined timing.

2. An apparatus as claimed in claim 1, wherein the data stored in the memory include a plurality of words which corresponds to the respective data channels.

3. An apparatus as claimed in claim 2, wherein each of the words includes an enable flag, a set value corresponding to the bit rate assigned to the corresponding data channel, and an operation value.

4. An apparatus as claimed in claim 3, wherein the controller includes:
  an address counter for cyclically addressing each of the words at the constant intervals;
  an adder for updating the operation value included in the word addressed by the address counter when the enable flag included in the word addressed by the address counter is active; and
  a comparator for comparing the updated operation value with the set value included in the word addressed by the address counter, and for issuing the command to generate a cell for the data channel corresponding to the addressed word when the updated set value is equal to the set value.

5. An apparatus as claimed in claim 1, wherein the data stored in the memory include a plurality of words each of which has a plurality of bit positions corresponding to the respective data channels, 6. An apparatus as claimed in claim 5, wherein the controller include:
  an address counter for cyclically addressing each of the words at the constant intervals;
  a flag detector for detecting flags included in the words addressed by the address counter, and for issuing the commands to generate the cells for the data channels corresponding to the bit positions at which the flags exists in the addressed word.

* * * * *